United States Patent [19]
Djuvik

[11] 3,796,512
[45] Mar. 12, 1974

[54] EGG BEATER
[76] Inventor: Carl Djuvik, 10305 Cameo Dr., Sun City, Ariz. 85351
[22] Filed: June 28, 1972
[21] Appl. No.: 267,246

[52] U.S. Cl. .................. 416/202, 416/76, 416/237, 416/238, 259/DIG. 29
[51] Int. Cl. ............................................ A47j 43/10
[58] Field of Search ....... 416/76, 78, 227, 228, 238, 416/237; 259/107, 108, DIG. 35, 28, 29

[56] References Cited
UNITED STATES PATENTS
2,316,861  4/1943  Hansen ........................... 259/110
2,733,900  2/1956  Wobensmith ............... 259/DIG. 38
2,760,763  8/1956  Harper ................................ 99/485

FOREIGN PATENTS OR APPLICATIONS
1,025,593  3/1958  Germany ..................... 259/DIG. 35
1,160,583  1/1964  Germany ..................... 259/DIG. 35
1,293,411  4/1969  Germany ..................... 259/DIG. 35

Primary Examiner—Everette A. Powell, Jr.

[57] ABSTRACT

A motor held kitchen aid in the form of a pointed, bent wire is inserted into an egg and rotated. The beaten contents are then delivered directly from shell to cooking or baking mix.

1 Claim, 2 Drawing Figures

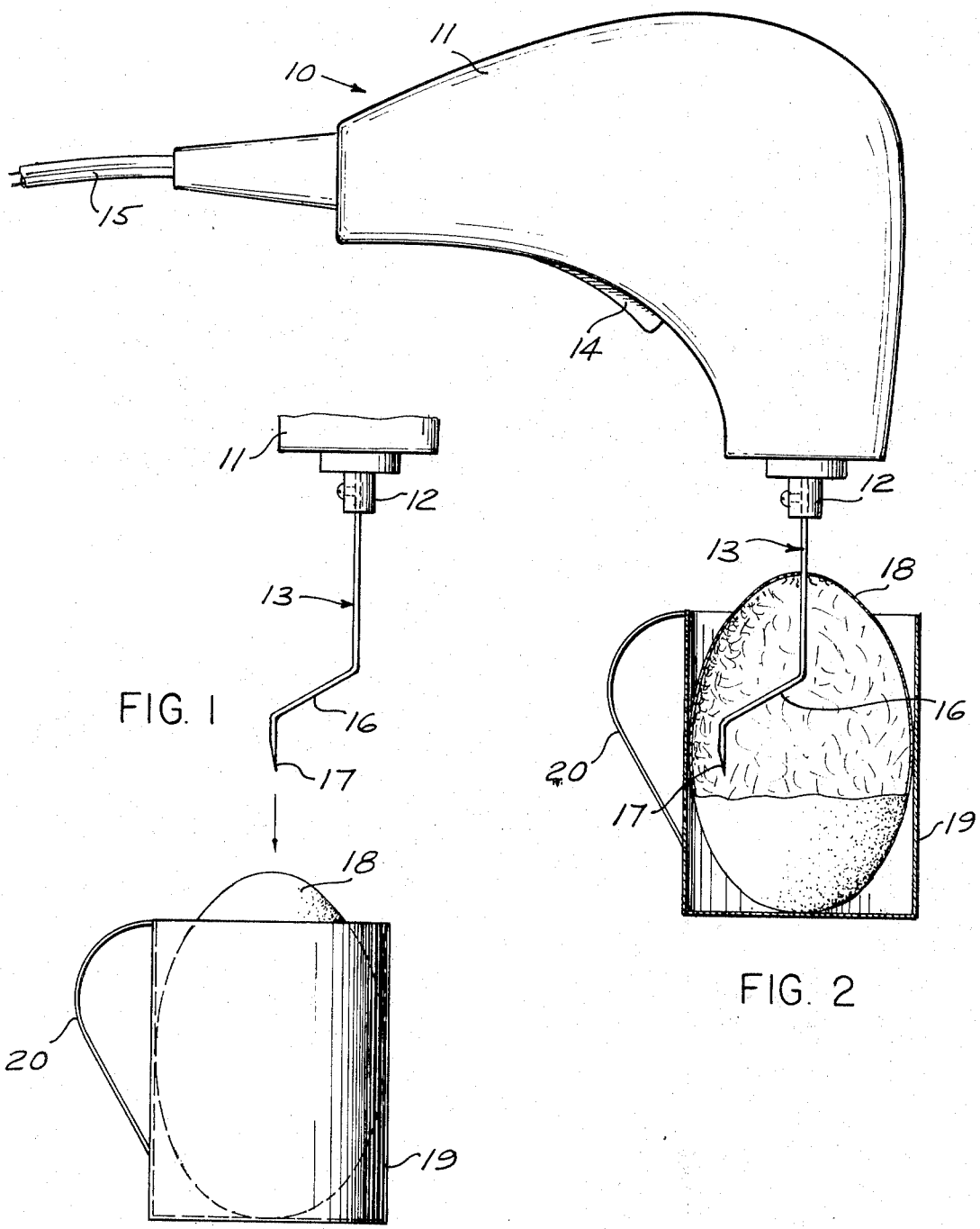

EGG BEATER

This invention relates to kitchen aids, more specifically to food beaters.

A principal object of the present invention is to provide an egg beater that whips the egg directly in the shell. A motor-rotated, pointed wire is first used to pierce the egg. The wire is then spun. Breaking the beaten egg directly into the mix thus eliminates extra dishwashing of conventional, oversize mixer parts. The only part to be cleaned is the beater wire.

Another object of the present invention is to provide an egg beater of the type described that is attractive to the purchaser in that the small motor, few parts and light assembly brings the cost down.

These and other objects will be readily evident upon a study of the following specification and the accompanying drawing wherein:

FIG. 1 is a fragmentary view of the egg beater positioned over an egg supported in a container prior to insertion.

FIG. 2 is a view of the egg beater in the operative position.

The figures show an egg beater 10, according to the invention, comprising a motor-enclosing housing 11 in which the motor shaft 12 supports a wire 13. Housing 11 has a comfort designed pressure switch 14. The motor cord 15 extends from the rear of the housing so that it does not interfere with the hand-grasp.

Wire 13 is formed with a dog-leg bend 16 and terminates in a point 17.

The egg 18 is preferably held in a rigid position in a container 19 which may have a handle 20. It then becomes convenient to hold the egg motionless during beating.

It becomes evident that the shell remains intact except for the small hole made by point 17. The contents may then be moved about conveniently until broken into the food mix. Wire 13 is the only part of the assembly that needs cleaning thereby conserving the user's time.

What I Now claim is:

1. An egg beater comprising a hand held housing enclosing a motor and a motor driven attachment terminating in a point, said wire including a straight base leg portion for being driven by said motor, an intermediate angularly inclined straight leg portion, and a terminal leg portion that has said point, said terminal leg portion being straight and parallel to said base leg portion.

* * * * *